United States Patent
Matsuo

(10) Patent No.: US 7,260,316 B2
(45) Date of Patent: Aug. 21, 2007

(54) DIGITAL BROADCAST/ANALOG BROADCAST RECEIVING AND RECORDING APPARATUS

(75) Inventor: Masahiro Matsuo, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 937 days.

(21) Appl. No.: 10/629,105

(22) Filed: Jul. 29, 2003

(65) Prior Publication Data

US 2004/0036804 A1 Feb. 26, 2004

(30) Foreign Application Priority Data

Aug. 22, 2002 (JP) ............................ P2002-241561

(51) Int. Cl.
*H04N 5/911* (2006.01)
(52) U.S. Cl. .................... 386/113; 386/46; 386/124
(58) Field of Classification Search .............. 386/46, 386/83, 100, 108, 109, 111–113, 124
See application file for complete search history.

(56) References Cited

U.S. PATENT DOCUMENTS

| | | | | |
|---|---|---|---|---|
| 5,734,444 A | * | 3/1998 | Yoshinobu | .................. 386/83 |
| RE38,513 E | * | 5/2004 | Oshima | ....................... 386/46 |
| 6,751,398 B2 | * | 6/2004 | Agnihotri et al. | ............. 386/46 |
| 6,901,209 B1 | * | 5/2005 | Cooper et al. | .............. 386/109 |
| 7,003,213 B1 | * | 2/2006 | Hasegawa | ..................... 386/83 |

FOREIGN PATENT DOCUMENTS

| | | |
|---|---|---|
| JP | 2001-285734 | 10/2001 |
| JP | 2001-320639 | 11/2001 |

OTHER PUBLICATIONS

Patent Abstracts of Japan No. 2001-285734, dated Oct. 12, 2001 (1 page).
Patent Abstracts of Japan No. 2001-320639, dated Nov. 16, 2001 (1 page).

* cited by examiner

*Primary Examiner*—James J. Goody
*Assistant Examiner*—Christopher Onuaku
(74) *Attorney, Agent, or Firm*—Osha Liang LLP

(57) ABSTRACT

A transport stream TSd generated from a digital broadcast signal and a transport stream TSa generated from an analog broadcast signal are recorded simultaneously and a portion of TSd wherein the reception state of the digital broadcast is bad is replaced with TSa corresponding to the defective portion for compensation. A composite TS consisting of good TSd and TSa corresponding to defective TSd 102 is formed and recorded.

4 Claims, 2 Drawing Sheets

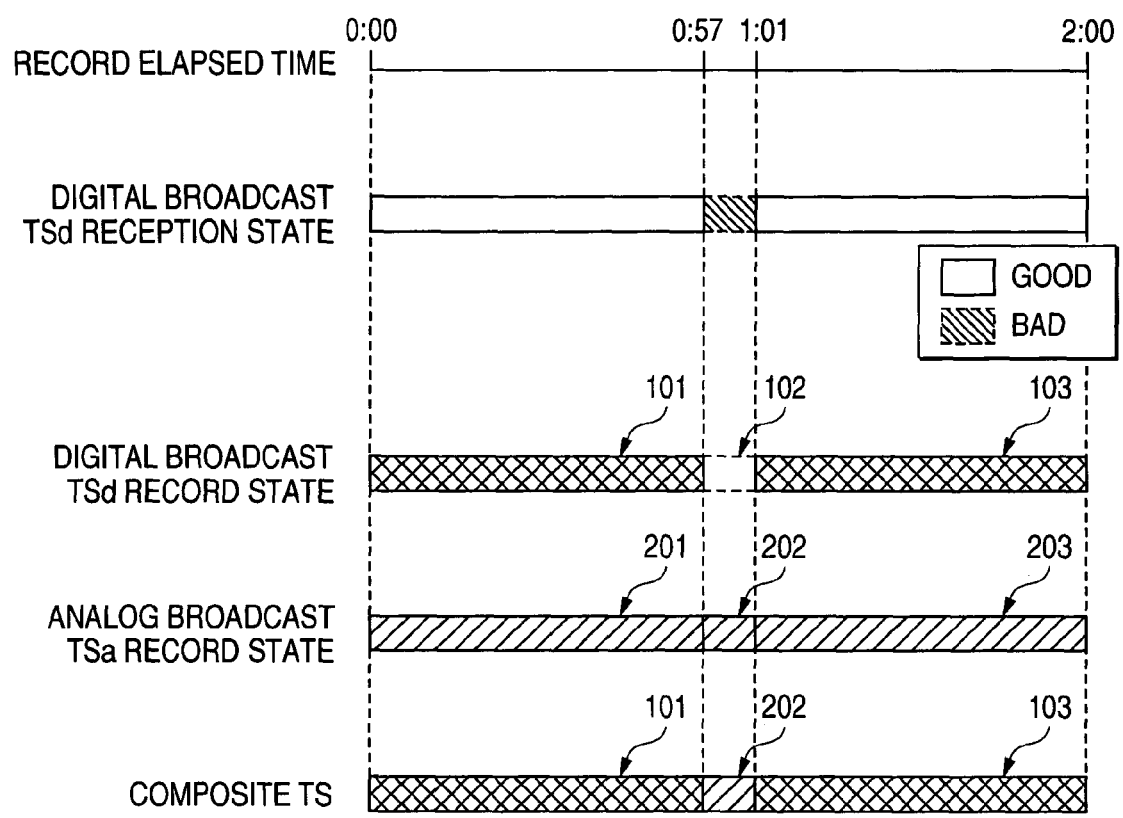

DIGITAL BROADCAST/ANALOG BROADCAST RECEIVING AND RECORDING APPARATUS

BACKGROUND OF THE INVENTION

1. Field of the Invention

The present invention relates to a digital broadcast/analog broadcast receiving and recording apparatus for receiving a digital broadcast signal and an analog broadcast signal, outputting a video signal and an audio signal of a selected channel, and recording digital data generated based on the digital broadcast signal and the analog broadcast signal.

2. Description of the Related Art

A digital broadcast/analog broadcast receiving and recording apparatus includes a circuit for receiving a digital broadcast signal and a circuit for receiving an analog broadcast signal and converts the received broadcast signal into digital data in a specific format such as an MPEG format, and records the digital data on a record medium such as a hard disk.

Upon reception of digital broadcast waves and analog broadcast waves, a tuner extracts and amplifies the digital broadcast signal or the analog broadcast signal of the selected channel. When the selected channel is of the digital broadcast signal, the digital broadcast signal is transmitted to a digital signal demodulation section, which then converts the digital broadcast signal into a transport stream (TSd) of digital data. When the selected channel is of the analog broadcast signal, an analog signal demodulation section demodulates the analog broadcast signal into a video signal and an audio signal and transmits the signals to an encoder, which then converts the signals into a transport stream (TSa) of digital data. Each of the transport streams (TSd and Tsa) is input through a system controller to a decoder, converted by the decoder into a video signal and an audio signal, and output from the decoder. The output video signal and audio signal are input to an analog television receiver for a viewer to view any desired program. When the viewer uses a remote controller to perform record operation, a CPU gives a record instruction to the system controller. The system controller stores received transport streams (TSd and Tsa) on a record medium separately.

As the C/N ratio of a digital broadcast signal falls below a predetermined threshold value, neither video nor audio is provided. Thus, when the reception state of a digital broadcast signal worsens, namely, the C/N ratio of the digital broadcast signal falls below the predetermined threshold value as an airplane passes through the face of an antenna, for example, while a digital broadcast receiving and recording apparatus (digital broadcast/analog broadcast receiving and recording apparatus) is receiving the digital broadcast signal, it is made impossible to view or record the video and audio during the worsened reception state. As the video and audio are thus interrupted, it is made impossible for the viewer to understand or follow the story of the program.

When recording a program, if digital broadcast signals are recorded from the beginning of the program, the portions of providing clear video before and after the broadcast is interrupted and the portion of no video are recorded. Thus, the viewer can later see only the program with the video interrupted and a problem as described above occurs. A Japanese unexamined patent publication JP-A-2001-285734 discloses a technique wherein when the digital broadcast is interrupted, a transition is made to the analog broadcast of the same program as interrupted to continue recording the program. However, when the digital broadcast is recovered from the interruption, recording the program in the analog broadcast is continued and thus when the viewer programs the apparatus to record a digital broadcast program by preference, the program in the analog broadcast is recorded and satisfactory video and audio cannot be provided for the viewer. As disclosed in a Japanese unexamined patent publication, JP-A-2001-320639, a technique is available wherein when the reception state of a digital broadcast worsens, the same program broadcast in a different time period is found and if the program exists, the same program in the different time is recorded. However, there is a sufficient probability that the program is not yet broadcasted at the point in time at which the viewer wants to play back the program; the program cannot reliably be recorded. If the program broadcast in the different time period is an analog broadcast, satisfactory video and audio cannot be provided against a viewer's will.

Since the viewer is to record the digital broadcast program because the digital broadcast provides better video and audio quality than the analog broadcast, it is desirable that the programs to be recorded should be those in digital broadcasts as much as possible.

SUMMARY OF THE INVENTION

It is therefore an object of the invention to provide a digital broadcast/analog broadcast receiving and recording apparatus that can reliably provide clear video and audio as much as possible without interruption of video and audio using the corresponding analog broadcast when the reception state of a digital broadcast worsens temporarily during a recording process of the digital broadcast.

In order to achieve the above object, according to a first aspect of the invention, there is provided a digital broadcast/analog broadcast receiving and recording apparatus including: a receive section adapted to receive a digital broadcast signal and an analog broadcast signal; a demodulate section adapted to demodulate the digital broadcast signal of a selected channel into a first digital data; an encode section adapted to encode the analog broadcast signal of a channel corresponding to the selected channel into a second digital data; a record section adapted to record the first digital data and the second digital data in a predetermined format; and a control section adapted to control a recording process of the record section, wherein the control section includes: an identifying unit adapted to identify the analog broadcast signal channel broadcasting the same program as the program on the selected digital broadcast signal channel; a first controlling unit adapted to control the record section to record the first digital data and the second digital data in parallel as different files; and a replacing unit adapted to replace a portion of the first digital data wherein the C/N ratio becomes equal to or less than a predetermined threshold value with the second digital data corresponding to the portion for compensation.

According to the first aspect of the invention, while a digital broadcast signal program is being received and recorded, when the reception state of the digital broadcast worsens, the corresponding analog broadcast signal program is simultaneously received and stored. A transport stream TSd of the first digital data of only the portion wherein neither video nor audio can be provided by the digital broadcast signal is replaced with a transport stream TSa of the second digital data provided by the analog broadcast signal for compensation.

According to a second aspect of the invention, in addition to the first aspect of the invention, the control section further includes: a second controlling unit adapted to control the record section to record the first digital data compensated with the second digital data; and an erasing unit adapted to erase the second digital data recorded onto the record section.

According to the second aspect of the invention, in the portion wherein the reception state of the digital broadcast signal is good, the transport stream TSd of the first digital data generated based on the digital broadcast signal is recorded and in the portion wherein the reception state of the digital broadcast signal is bad, the transport stream TSa of the second digital data provided by the analog broadcast signal is recorded for compensating for the bad portion, whereby the data is recorded on the record section as one continuous transport stream file. The transport stream, which becomes unnecessary because of the compensation, is erased from the record medium.

According to a third aspect of the invention, in addition to the first aspect of the invention, the control section further includes: an observing unit adapted to observe a C/N ratio of the digital broadcast signal; an a storing unit adapted to store a time period in which the C/N ratio becomes equal to or less than a predetermined threshold value as compensation time information, and wherein the replacing unit replaces the portion of the first digital data with the second digital data based on time information contained in the first digital data and that contained in the second digital data.

According to the third aspect of the invention, the control section of the apparatus observes the C/N ratio and stores the portion in which the C/N ratio becomes equal to or less than the threshold value, namely, the portion wherein the transport stream TSd cannot be provided by the digital broadcast signal is stored as compensation time information. In compensating, the time information contained in the transport stream TSd and that contained in the transport stream TSa are referenced and the defective portion of the transport stream TSd is replaced with the corresponding portion of the transport stream TSa for compensation.

BRIEF DESCRIPTION OF THE DRAWINGS

The above objects and advantages of the present invention will become more apparent by describing preferred exemplary embodiment thereof in detail with reference to the accompanying drawings, wherein:

FIG. 2 is a schematic drawing to show record elapsed time, reception state of digital broadcast, record state of TSd, record state of TSa, and composite TS provided by replacing TSd with TSa for compensation.

DETAILED DESCRIPTION OF THE PREFERRED EMBODIMENTS

Figure 1:
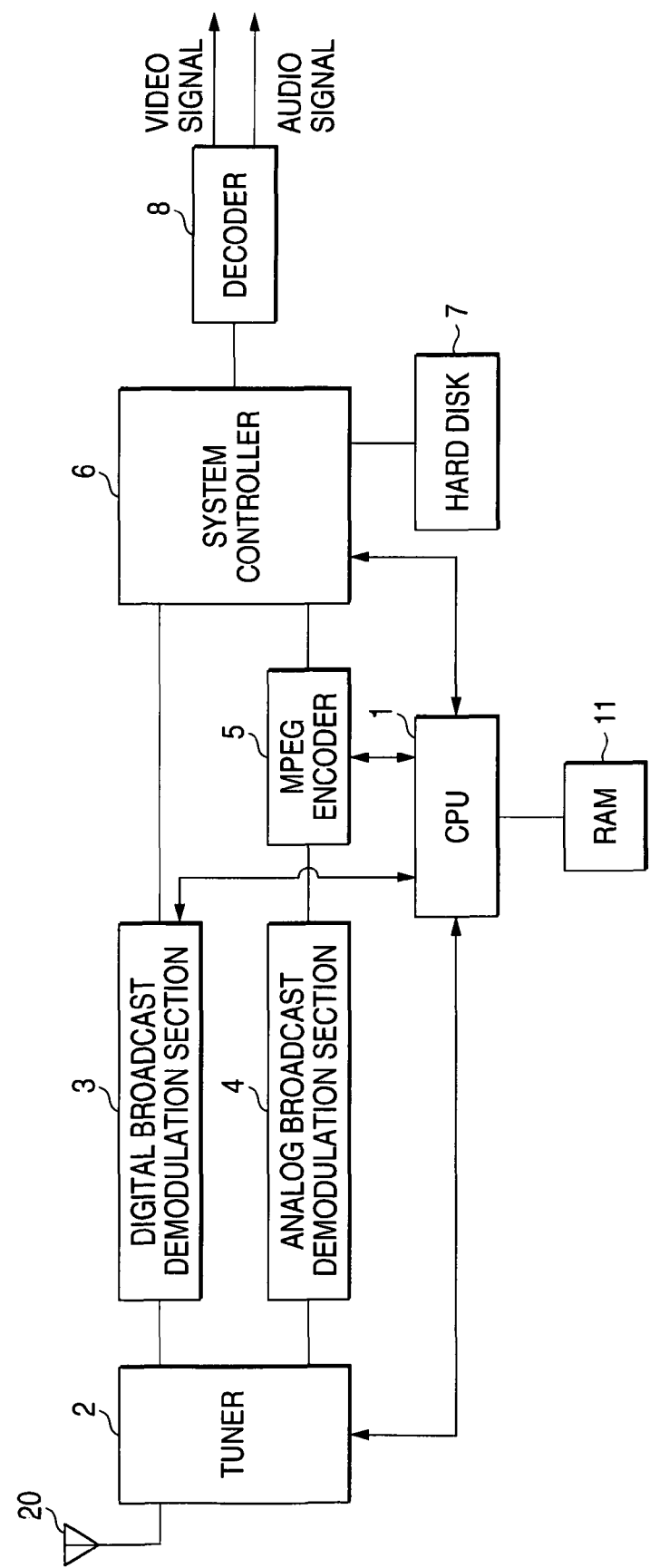
FIG. 1 is a block diagram to show a main part of a digital broadcast/analog broadcast receiving and recording apparatus according to a preferred embodiment of the invention.

A digital broadcast/analog broadcast receiving and recording apparatus according to a preferred embodiment of the invention will be discussed with reference to the accompanying drawings.

FIG. 1 is a block diagram to show a main part of the digital broadcast/analog broadcast receiving and recording apparatus according to the embodiment.

The digital broadcast/analog broadcast receiving and recording apparatus includes main components of a tuner 2 (receive section), a digital broadcast demodulation section 3 (demodulation section), an analog broadcast demodulation section 4, an MPGE encoder 5 (encode section), a system controller 6 and a hard disk 7 corresponding to a record section of the invention, an MPEG decoder 8, a CPU 1 corresponding to a control section of the invention, and a RAM 11 connected to the CPU 1. The tuner 2 includes a digital broadcast signal reception section and an analog broadcast signal reception section and a digital broadcast signal and an analog broadcast signal can be received at the same time. The CPU 1 includes a plurality of units each adapted to perform a specific process or operation, which will be described later.

In receiving a digital broadcast program, when a viewer uses a remote controller to select a channel on which any desired program is broadcast, a selection signal is transmitted to the CPU 1, which then controls the tuner 2 so as to extract the selected channel. A digital broadcast wave received at an antenna 20 is input to the tuner 2. The tuner 2 extracts and amplifies the digital broadcast signal of the channel broadcasting the selected program and outputs the digital broadcast signal to the digital broadcast demodulation section 3, which then converts the input digital broadcast signal into a transport stream TSd (simply, TSd) in an MPEG format as first digital data and outputs TSd to the system controller 6. The system controller 6 outputs the input TSd to the MPEG decoder 8, which then separates input TSd into video data and audio data and then converts the video data and the audio data into an analog video signal and an analog audio signal. When information such as text information is included, the MPEG decoder 8 superposes the text information on the video signal as a closed caption and outputs the signals to a television receiver (not shown). The television receiver uses the video signal to display video on a screen and uses the audio signal to generate audio from an audio output section such as a loudspeaker.

When the viewer performs record operation, the CPU 1 controls the system controller 6 so as to record input TSd on the hard disk 7 of a record medium as a file in a predetermined format (in this case, MPEG format). When the viewer plays back the recorded file, the system controller 6, which receives an instruction to play back from the CPU 1, reads TSd recorded on the hard disk 7 and outputs TSd to the MPEG decoder 8. When the viewer programs the apparatus to record a program, the CPU 1 stores the programming description in the RAM 11 and when the record start time is reached, the CPU 1 controls the system controller 6 to start recording the program. When the record end time is reached, the CPU 1 controls the system controller 6 to stop recording the program.

In receiving an analog broadcast program, the viewer uses the remote controller to select a channel on which any desired program is broadcast, a selection signal is transmitted to the CPU 1, which then controls the tuner 2 so as to extract the selected channel. An analog broadcast wave received at the antenna 20 is input to the tuner 2. The tuner 2 extracts and amplifies the analog broadcast signal of the channel broadcasting the selected program and outputs the analog broadcast signal to the analog broadcast demodulation section 4, which then converts the input analog broadcast signal into an analog video signal and an analog audio signal and outputs the signals to the MPEG encoder 5. The MPEG encoder 5 encodes the input analog video signal and analog audio signal to generate a transport stream TSa (simply, TSa) of second digital data, and outputs TSa to the system controller 6. To convert the analog video signal and the analog audio signal into TSa, the MPEG encoder 5 generates various pieces of additional information of multiplexing and synchronization together with video data (stream) and audio data (stream) generated based on the video signal and the audio signal and adds the additional information to TSa. The additional data contains time information used in synchronous playback. The time information makes it possible to identify the positional relationship between the streams in time sequence. The sequence after TSa is input to the system controller 6 is the same as that of TSd generated based on the digital broadcast signal and therefore will not be discussed again.

Hereinafter, processing performed when the reception state worsens while a digital broadcast is received and recorded will be discussed.

When the viewer performs record operation of a digital broadcast with the remote controller the CPU 1 receives the operation instruction to perform the record operation. When the viewer programs the apparatus to record a program, the programming description such as the channel, the record start time and the record end time is recorded in the RAM 11. When the viewer does not program the apparatus to record a program, the CPU 1 specifies the channel to be received for the tuner 2. The CPU 1 analyzes additional information of TSd received in the tuner 2 and provided by the digital broadcast demodulation section 3 and checks whether or not the program broadcast in the digital broadcast being received at present is broadcast on another analog broadcast channel. If the same program is broadcast in an analog broadcast, the CPU 1 instructs the tuner 2 to receive the corresponding analog broadcast signal. The analog broadcast demodulation section 4 converts the received analog broadcast signal into a video signal and an audio signal and the MPEG encoder 5 converts the video signal and the audio signal into TSa.

The CPU 1 acquires time information of TSd generated by the digital broadcast demodulation section 3 and time information of TSa generated by the MPEG encoder 5, analyzes the two pieces of time information, relates them to each other, and stores the time information in the RAM 11.

TSd and TSa are input to the system controller 6 and are recorded on the hard disk 7. The system controller 6 receives TSd and TSa at the same time and stores TSd and TSa in attached memory for each predetermined unit and then transmits TSd and TSa alternately to the hard disk 7 for recording TSd and TSa. That is, while TSd is stored in the memory, TSa previously stored in the memory is transmitted to the hard disk 7. At the termination, while TSa is stored in the memory, stored TSd is transmitted to the hard disk 7. TSd and TSa are thus recorded on the hard disk 7 at the same time. Here, TSd and TSa are recorded on the hard disk 7 as separate files.

When the reception state of the digital broadcast worsens temporarily as shown in FIG. 2, TSd generated from the digital broadcast signal is recorded on the hard disk 7 in a state in which a severely bad TSd section 102 (0:57 to 1:01) providing neither video nor audio exists between good TSd sections 101 and 103 (0:00 (record start) to 0:57 and 1:01 to 2:00 (record end)) providing clear video and audio. On the other hand, TSa generated from the analog broadcast signal is recorded on the hard disk 7 in a state in which a TSa section 202 providing video and audio a little hard to view and hear on which noise is superposed exists between good TSa sections 201 and 203 providing good video and audio although inferior to those of the digital broadcast signal.

The CPU 1 observes the C/N ratio of the digital broadcast signal received in the tuner 2 at predetermined intervals and acquires compensation time information at the point in time at which the C/N ratio becomes equal to or less than a preset threshold value (C/N ratio at which video data and audio data can be provided) from the digital broadcast demodulation section 3. The CPU 1 also acquires compensation time information at the point in time at which the C/N ratio exceeds the threshold value. The compensation time information pieces are stored in the RAM 11.

At the termination of recording the desired program, when a portion where the C/N ratio is equal to or less than the threshold value exists, the CPU 1 replaces the TSd section 102 of the portion where the C/N ratio is equal to or less than the threshold value with the TSa section 202 corresponding to the section at the identical time based on the compensation time information, the time information of TSd, and the time information of TSa to compensate for the portion wherein neither video nor audio can be provided.

As a compensation method, the TSd section 102 is overwritten with the TSa section 202 and the TSa sections 201 and 203 are erased.

A new TS (composite TS in FIG. 2) file consisting of TSd 101, TSa 202, and TSd 103 may be formed and saved on the hard disk 7 and stored TSd 101 to TSd 103 and TSa 201 to TSa 203 may be erased.

The CPU 1 detects the time information of TSa corresponding to the time information of TSd from the time information of TSd at the point in time at which the C/N ratio of the digital broadcast signal lowers based on the correlation between the time information of TSd and the time information of TSa stored in the RAM 11, and uses the time information of TSa for compensation time matching.

In doing so, if some part where video and audio are slightly bad exists, the viewer can receive continuous video and audio as clear as possible according to the recorded transport streams. The viewer can also view the program recorded by programming reliably when the viewer wants to play back the program. Since the unnecessary sections of TSd and TSa are erased after the program is saved on the hard disk, the hard disk can be used efficiently.

In the embodiment, the method of recording TSd and TSa and replacing the bad part of TSd with the corresponding part of TSa and then saving is shown. However, the good parts of TSd and the TSa part corresponding to the bad part of TSd may be saved separately and may be played back so as to provide continuous video and audio based on the time information under the control of the CPU 1.

In the embodiment, compensation is conducted after completion of recording. However, since the time information is added to TSd and TSa, compensation may be conducted in parallel with recording TSd and TSa in order.

To conduct compensation, when the C/N ratio falls below the threshold value, the CPU 1 may control the system controller 6 to switch from recording of TSd to recording of TSa and if the C/N ratio: becomes larger than the threshold value, the CPU 1 may control the system controller 6 to switch from recording of TSa to recording of. TSd.

As described above with reference to the preferred embodiment of the invention, according to the digital broadcast/analog broadcast receiving and recording apparatus of the invention, only the portion wherein neither video nor audio can be provided from the digital broadcast signal is replaced with the analog broadcast signal of the corresponding analog broadcast at the same time as the digital broadcast, so that hen some part where video and audio are slightly bad exists, the viewer can receive continuously recorded video and audio as clear as possible. Since unnecessary record data is erased after the compensation, the record medium can be used efficiently. Since compensation is conducted based on the compensation time stored in the RAM and the time information added to TSd and TSa, compensation part matching can be performed precisely and video and audio can be recorded without interruption more reliably.

Although the present invention has been shown and described with reference to the specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A digital broadcast/analog broadcast receiving and recording apparatus comprising:

a receive section adapted to receive a digital broadcast signal and an analog broadcast signal;

a demodulate section adapted to demodulate the digital broadcast signal of a selected channel into a first digital data;

an encode section adapted to encode the analog broadcast signal of a channel corresponding to the selected channel into a second digital data;

a record section adapted to record the first digital data and the second digital data in a predetermined format; and a control section adapted to control a recording process of the record section, wherein the control section comprises:

an identifying unit adapted to identify the analog broadcast signal channel broadcasting the same program as the program on the selected digital broadcast signal channel;

a first controlling unit adapted to control the record section to record the first digital data and the second digital data in parallel as different files;

an observing unit adapted to observe a C/N ratio of the digital broadcast signal;

a storing unit adapted to store a time period in which the C/N ratio becomes equal to or less than a predetermined threshold value as compensation time information;

a replacing unit adapted to replace a portion of the first digital data wherein the C/N ratio becomes equal to or less than the predetermined threshold value with the second digital data corresponding to the portion for compensation based on time information contained in the first digital data and that contained in the second digital data;

a second controlling unit adapted to control the record section to record the first digital data compensated with the second digital data; and an erasing unit adapted to erase the second digital data recorded onto the record section.

2. A digital broadcast/analog broadcast receiving and recording apparatus comprising:

a receive section adapted to receive a digital broadcast signal and an analog broadcast signal;

a demodulate section adapted to demodulate the digital broadcast signal of a selected channel into a first digital data;

an encode section adapted to encode the analog broadcast signal of a channel corresponding to the selected channel into a second digital data;

a record section adapted to record the first digital data and the second digital data in a predetermined format; and a control section adapted to control a recording process of the record section, wherein the control section comprises:

an identifying unit adapted to identify the analog broadcast signal channel broadcasting the same program as the program on the selected digital broadcast signal channel;

a first controlling unit adapted to control the record section to record the first digital data and the second digital data in parallel as different files; and a replacing unit adapted to replace a portion of the first digital data wherein the C/N ratio becomes equal to or less than a predetermined threshold value with the second digital data corresponding to the portion for compensation.

3. The digital broadcast/analog broadcast receiving and recording apparatus as claimed in claim 2, wherein the control section further, comprises:

a second controlling unit adapted to control the record section to record the first digital data compensated with the second digital data; and an erasing unit adapted to erase the second digital data recorded onto the record section.

4. The digital broadcast/analog broadcast receiving and recording apparatus as claimed in claim 2, wherein the control section further comprises:

an observing unit adapted to observe a C/N ratio of the digital broadcast signal; and a storing unit adapted to store a time period in which the C/N ratio becomes equal to or less than a predetermined threshold value as compensation time information, and wherein the replacing unit replaces the portion of the first digital data with the second digital data based on time information contained in the first digital data and that contained in the second digital data.

* * * * *